United States Patent
Bumgarner et al.

(10) Patent No.: US 10,017,707 B2
(45) Date of Patent: *Jul. 10, 2018

(54) METHOD AND MACHINE FOR THE PRODUCTION OF LOW EMISSION BIOMASS FUEL COMPOSITION FROM WASTE MATERIALS

(71) Applicant: V35A Enterprises, LLC, Fairfax, IA (US)

(72) Inventors: Timothy Bumgarner, Fairfax, IA (US); Joseph Kempf, Pompano Beach, FL (US)

(73) Assignee: V35A Enterprises, LLC, Fairfax, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/256,320

(22) Filed: Sep. 2, 2016

(65) Prior Publication Data

US 2017/0058224 A1 Mar. 2, 2017

Related U.S. Application Data

(63) Continuation of application No. 14/489,446, filed on Sep. 17, 2014, now Pat. No. 9,499,757, which is a
(Continued)

(51) Int. Cl.
*C10L 5/44* (2006.01)
*C10L 5/08* (2006.01)
(Continued)

(52) U.S. Cl.
CPC ............... *C10L 5/08* (2013.01); *C10L 5/361* (2013.01); *C10L 5/363* (2013.01); *C10L 5/46* (2013.01);
(Continued)

(58) Field of Classification Search
CPC .... C10L 5/44; C10L 5/40; C10L 5/403; C10L 5/46; C10L 5/48
(Continued)

(56) References Cited

U.S. PATENT DOCUMENTS 9,499,757 B2 * 11/2016 Bumgarner ............. C10L 5/361
2010/0300368 A1 * 12/2010 Myers .................. A01K 1/0154
119/171
(Continued)

*Primary Examiner* — Ellen M McAvoy
(74) *Attorney, Agent, or Firm* — Lisa M. Gehrke; Gehrke & Associates, SC

(57) ABSTRACT

The present disclosure provides a novel method and machine for the production of a biomass composition from waste materials including the steps of evaluating the waste material for emissions related factors, treating the evaluated waste material with the additive composition to form a low emissions biomass composition and shaping the biomass composition into solid fuel formations. The present invention further provides an additive composition used in the treatment of the waste materials that comprises an emission sponge, a filler and optional BTU modifier. The treating step includes the steps of sizing selected waste materials, blending the sized waste materials with the additive composition formulated specifically for the waste material and forming with a press the blended waste materials into solid fuel formations. The resulting biomass solid fuel formations produce lower emissions than typically produced by coal and may be combined with, or used in place of coal in fuel burning structures and devices.

10 Claims, 2 Drawing Sheets

Related U.S. Application Data continuation-in-part of application No. 14/217,153, filed on Mar. 17, 2014, now Pat. No. 9,920,271.

(60) Provisional application No. 61/801,618, filed on Mar. 15, 2013, provisional application No. 61/801,693, filed on Mar. 15, 2013.

(51) Int. Cl.
*C10L 5/36* (2006.01)
*C10L 5/46* (2006.01)

(52) U.S. Cl.
CPC ....... *C10L 2290/28* (2013.01); *C10L 2290/30* (2013.01); *Y02E 50/10* (2013.01); *Y02E 50/30* (2013.01)

(58) Field of Classification Search
USPC ......... 44/577, 635, 589, 593, 595, 605, 629, 44/636
See application file for complete search history.

(56) References Cited

U.S. PATENT DOCUMENTS

| | | | | |
|---|---|---|---|---|
| 2013/0276363 A1* | 10/2013 | Heimann | ................ | C10L 5/143 44/535 |
| 2014/0014748 A1* | 1/2014 | Zeeck | ....................... | C10L 5/44 241/18 |
| 2014/0173976 A1* | 6/2014 | Myers | ................. | A01K 1/0154 44/576 |

* cited by examiner

METHOD AND MACHINE FOR THE PRODUCTION OF LOW EMISSION BIOMASS FUEL COMPOSITION FROM WASTE MATERIALS

CROSS REFERENCE TO RELATED APPLICATION

This application is a continuation of U.S. Ser. No. 14/489,446 filed on Sep. 17, 2014 which is a continuation in part of U.S. patent application Ser. No. 14/217,153 filed on Mar. 17, 2014, which claims priority to provisional applications U.S. 61/801,618 and U.S. 61/801,693, both filed on Mar. 15, 2013. All of these applications are herein incorporated by reference.

SUMMARY OF THE INVENTION

The present disclosure is related to machines and methods of converting waste materials into burnable fuel. More specifically, the present disclosure is directed to a machine and method of making a low emission biomass fuel composition from treated waste material.

The present disclosure is directed to a novel machine and method for the production of a biomass composition from waste materials, such as landfill waste, industrial waste, construction waste, municipal garbage, biowaste including, but not limited to, switch grass, forest litter, paper waste, peat, cane waste, and other compostable garbage. The method includes the steps of evaluating the waste material for emissions related factors, treating and processing the evaluated waste material with a machine to form a low emissions biomass composition and shaping the biomass composition into solid fuel structures.

A machine is used to treat and process the waste material including the steps of sizing selected waste materials, blending the sized waste materials with an additive formulated specifically for the waste material and forming the blended waste materials into biomass fuel formations. The resulting biomass formations produce lower emissions than typically produced by coal and may be used as a replacement for coal, or as an additive to be combined with coal, in coal burning structures and devices.

Other features and advantages of the present invention will become apparent after study of the specification and claims that follow. All publications and patents mentioned in this application are herein incorporated by reference for any purpose.

BRIEF DESCRIPTION OF THE DRAWINGS

The following disclosure can be better understood with reference to the following detailed description together with the appended illustrative drawing in which like elements are numbered the same.

DEFINITIONS

As used herein, "waste material" and "waste materials" are defined as any waste materials, such as landfill waste, industrial waste, construction waste, municipal garbage, biowaste including switch grass, forest litter, paper waste, peat, cane waste, and other compostable garbage.

As used herein, "emission" or "emissions" are defined as environmentally undesirable gas byproducts of combustion, including greenhouse gases, carbon gases, and actually and potentially toxic or environmentally detrimental gases.

As used herein, "emission sponge" is defined as a material that absorbs toxic emissions and spent fuel and re-burns the spent fuel resulting in reduced carbon emissions and reduced actual and potential toxic or environmentally negative emissions from the fuel. Emission sponges include, but are not limited to, salt, sea salt, baking powder, calcium from sea shells, rice, rice by-product, their equivalents, and combinations thereof. The emission sponge is preferably salt, sea salt or combinations thereof.

As used herein, "filler" is defined as a material that acts as a mechanical bond within the waste material to fill voids. Fillers include natural products that would provide a mechanical bond between the waste material particles. These materials include flour, such as, soy flour, wheat flour, and rice flour, rice, oats, potatoes, their equivalents and combinations thereof.

As used herein, "BTU modifier" is defined as a material that can hold or transfer heat. BTU modifiers include, but are not limited to, steel slag, coal fines, iron powder, their equivalents, and, combinations thereof.

DETAILED DESCRIPTION OF THE INVENTION

The present disclosure provides a novel method for the production of a biomass fuel composition from waste materials. The raw input waste typically is municipal waste material that has been somewhat pre-processed before final disposal. Magnets may be used to help prevent undesired metal from entering the machine. Again, typically presorting is minimal because waste is commonly presorted prior to final disposal.

Once it is determined that the waste is generally acceptable, the waste is evaluated for emissions related factors and burn characteristics. This evaluation informs the machine operator as to the appropriate quantities of additive and the how to set various settings on the machine.

Figure 1A:
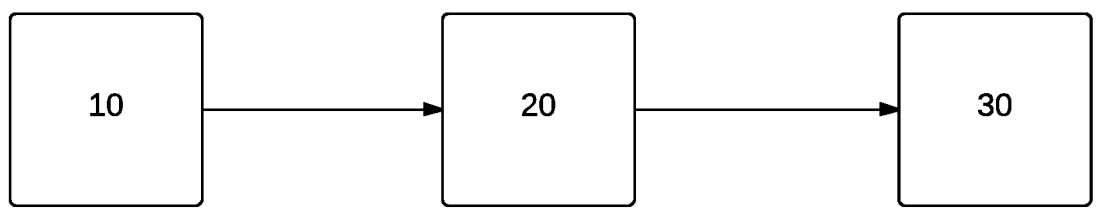
FIG. 1A is a flow chart illustrating the steps involved in the process of making a low emission biomass composition.

Referring to FIG. 1A, the method for the production of a biomass fuel composition from waste materials includes the steps of evaluating (10) selected waste material for emissions related factors, treating (20) the evaluated waste material to adjust the emission levels of the biomass composition, and forming (30) the biomass composition into solid fuel formations. The solid fuel formations resulting from this method will typically produce lower gas emission than coal alone. The solid fuel formations may be used in place of, or combined with coal, in fuel burning structures and devices.

In the evaluation step (10) information regarding certain properties of a selected starting waste material is gathered. These properties include the moisture/water content of the waste material, the gas emission levels released by the untreated waste material when it is burned, and the BTU levels produced by the untreated waste material when it is burned. The emission levels and BTU levels are then compared to the predetermined target levels for each property and used to formulate an additive used to produce a biomass fuel composition that displays target properties.

The moisture/water content of the untreated waste material will vary greatly but is preferably between 12.0% and 25.0% by weight and most preferably between 18.0% and 23.0% by weight. If the water content of the waste material needs to be increased, water will be added to the waste material during the treatment stage. If the water content is determined to be too high, additional waste material may be added to reduce the percentage of water in the waste material. Alternatively, the waste material may be dried until the water content is within the acceptable range.

The gas emission level of the untreated waste material is adjusted to its target level through the addition of an additive during the treatment step. The additive package may include an emission sponge, a filler and an optional BTU modifier. The formulation of a specific additive is determined by modifying batches of the untreated waste material with emission sponge, filler and optionally, BTU modifier until the target levels are achieved. For example, if the waste material is municipal garbage and it produces emissions higher than desired, the specific amount of emission sponge needed to lower the gas emission to the target level is calculated and included in the additive composition formulated for the municipal garbage. Likewise, if a BTU rating of a municipal garage sample is less than a desired amount, a BTU modifier is included in the additive to adjust the BTU rating of the municipal waste. The amount of BTU modifier needed to increase the BTU rating of the garbage is calculated and included in the additive composition formulated for the municipal garbage.

Although the particular formulation of the factors in the additive composition will vary depending upon specific target requirements, the amount of emission sponge is preferably between 0.1% to 10.0% by weight, and most preferably between 1.5% to 3.0% by weight, and, the amount of filler is preferably between 0.1% to 6.0% by weight, and most preferably between 1.0% to 3.0% by weight. If the biomass fuel composition will be used as an additive to be combined with coal, a BTU modifier will not be needed in the additive because the coal will serve as a BTU modifier. In this circumstance, the amount of emission sponge included in the additive composition, may be overloaded to provide emission reduction for the waste material and the coal with which it will be blended. If the biomass fuel composition is not being used as an additive, the amount of BTU modifier present in the additive is preferably between 0.1% to 50.00% by weight, and most preferably between 3.0% to 5.0% by weight.

Figure 1B:
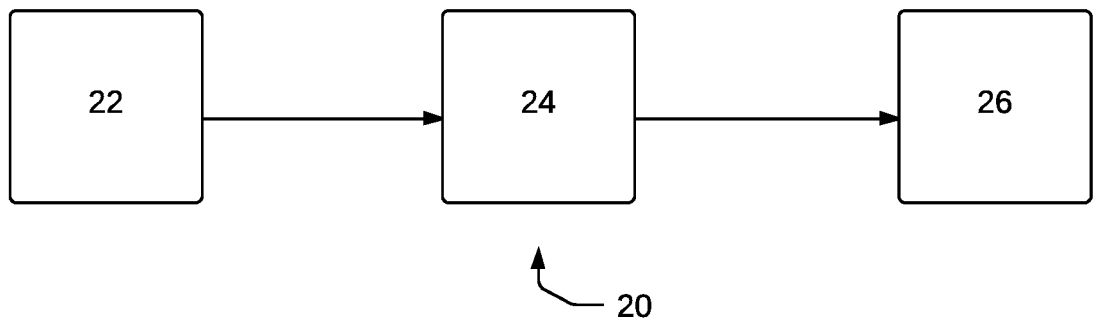
FIG. 1B is a flow chart illustrating the steps for the treatment of waste materials within the process of making low emission biomass composition.

Referring to FIG. 1B, the treating step (20) further comprises size reduction (22) of the selected waste materials soaking and blending (24) the sized waste materials with the additive composition formulated specifically for the waste material. An additional second size reduction (26) step may be necessary depending on the particle size of the biomass composition.

Figure 2:
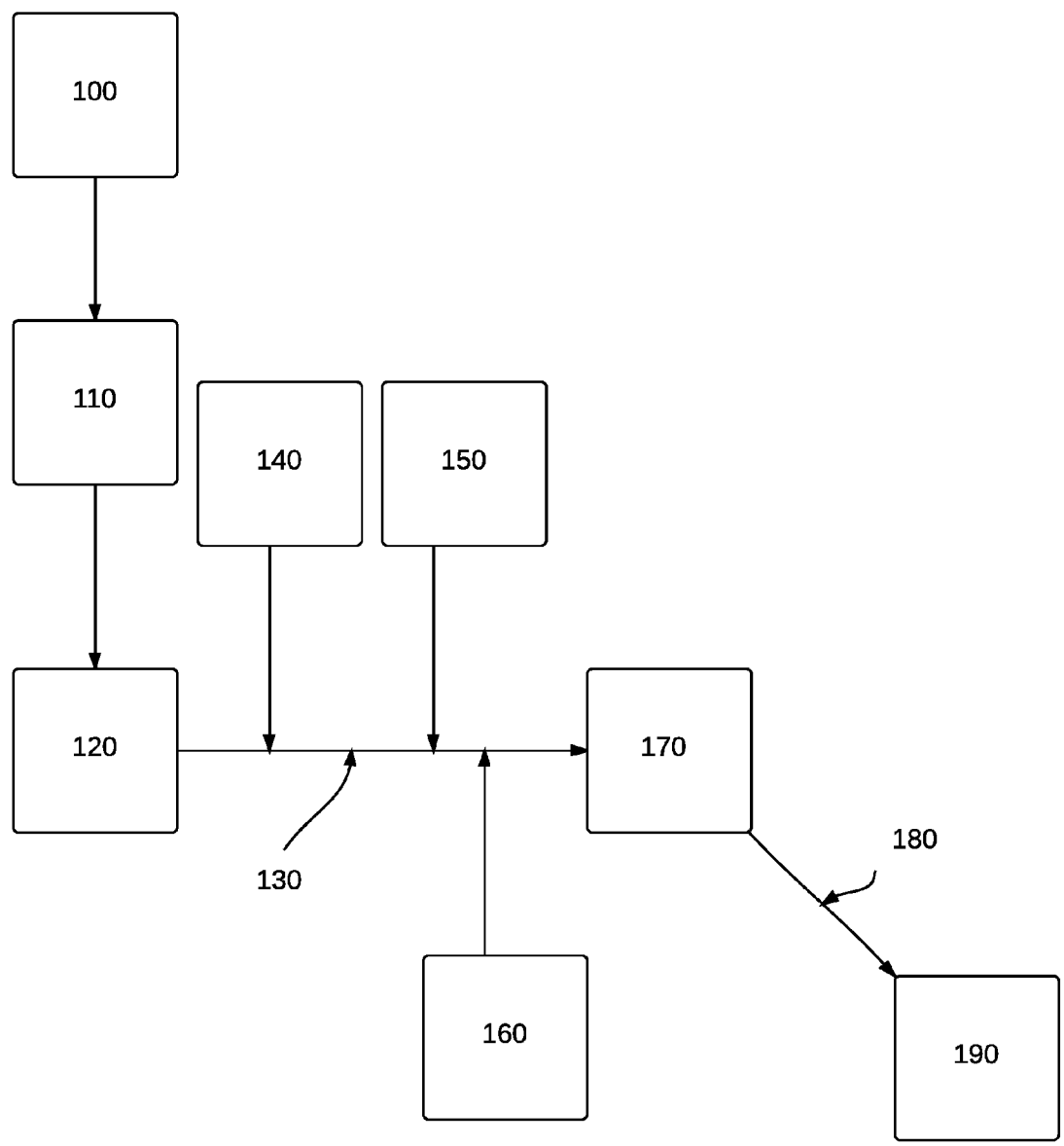
FIG. 2 is a flow chart illustrating the steps and mechanisms involved in the process of making low emission solid fuel formations in more detail.

Referring to FIG. 2, after the evaluation step, the waste material must be sized (120) to ensure the diameter of the waste material particles are uniform and not greater than one half inch. If the waste material particles have been pre-sized to fall within these parameters, a first size reduction is not needed. If, however, the waste material is irregular in shape and includes particles greater than one half inch in diameter, the particles are introduced to a hopper (100). Typically, a front-end-loader places the waste material into the hopper. The hopper has a means, such as gates, meters or sized openings to control the flow of the waste material onto a conveyor belt or similar physical conveyor. In alternative embodiments, multiple hoppers may be used to allow for the automatic and independent control of waste materials and additives entering the machine. In such an embodiment, each hopper is controlled via gates, meters, or openings to control the ratio of each hopper's content in the blend. In yet another alternative embodiment, multiple conveyors are used and the speed of the conveyor controls the ratio of materials sent to the size reduction device. The size reduction device (120) cuts and grinds the material to form uniform waste material particles not greater than one half inch in diameter and preferably between one half inch and one quarter inch in diameter.

A load metering device or similar device monitors the effort involved in the shredding process and controls the intake of material. The machine can support an optional electric generator and lights and an air compressor, which are sometimes desirable features. The speed and torque of the shredder is adjustable and can be changed to best deal with material being fed into the machine. As an example, an exchangeable set of gears are used to alter speed/torque so as to address variable bulk density of waste materials.

The sized waste material leaves the shredder and is moved by an auger or conveying device (130) into soaking area. In the preferred embodiment, the soaking area has a rotating auger, which both stirs the waste material and moves it toward the next processing step. The soaking area has an opening to allow the addition of the additive. As the material is moved, it is the treated with the additive formulated for use with that particular waste material as per the earlier evaluation. The additive is metered and falls into the sized material. Metering may be accomplished using a pellet meter or dosing unit (140), or may be tied to the auger speed, or may be controlled by gate sizes, or may be tied to the speed of the conveyor(s) from the hopper(s). This entire operation of dosing and soaking may also be accomplished in the rotating auger listed earlier in this paragraph.

The material and additive(s) are blended at a temperature of at least 130 degrees Fahrenheit, but preferably at least 135 degrees Fahrenheit, for at least one minute. As the material moves through the soaking area, it is monitored by devices to determine the moisture in material as it travels through the soaking area via the auger. Nozzles (150), located along the auger path, add water or blow air to alter moisture levels in materials. Heat is added, if necessary, by a heating element (160), preferably heating coils and recycled heat from the process.

The material may be passed by fixed magnets to remove unwanted ferrous metal, the treated waste composition is then fed into a size reduction device, such as a hammer mill (170) for further mechanical blending for a more uniformed distribution of components in the composition and additional size reduction until the size of the waste material particles is not greater than one quarter inch. A sizing screen is used to be sure larger material does not move past the hammermill. The hammermill can be set by the machine operator to produce coarse or fine treated biomass composition.

The treated biomass composition is then fed toward the next step by a device such as an auger (180). It falls into a press (190), such as a rotary press or roller press, and is formed into pellets, briquettes, spheres or other desired shapes. In an alternative embodiment, the treated biomass composition falls directly from the hammermill, which is located above the press, and into the press under the control of gravity alone. Adjustments in the pressure applied by the press on the treated biomass composition in the formation of the solid fuel formations may be used to further adjust the BTU ratings and the bulk density. The resulting solid formations may then be used directly as fuel.

An optional step of spraying the solid fuel formations with a coating may be used. A sprayer coats the solid fuel formations using a liquid starch, gel, or other spray-able coatings. This protects the solid fuel formations during transportation and storage, preserves the shape of the formations, and reduces any release of undesired odors.

Although the additive composition may be blended with the waste material at any point in the process prior to the shaping step, it is preferably blended into the waste material particulates following the first sizing step. The resulting biomass composition comprises between 3.2% to 56.00% by weight additive composition by weight and burns cleaner and more fully than conventional coal or blended biofuels as shown below.

The machine may have other features and enhancements that improve the overall operation of the machine or enhance its value in a particular circumstance. The machine operates at general atmospheric pressures and does not require the removal of oxygen or any gases. Removable access panels may be provided throughout the machine so as to allow easier repair. A diversion flap may be provided to allow the removal of unwanted materials without further processing. Nuts and bolts are used when possible to allow easier access and maintenance. Sizing blades can be replaced or removed and resharpened. Due to the nature of the service of the machine, many parts will need to be made of hardened steel or similar materials.

The machine is scalable. This would allow for a machine to be built to fit on a single truck-trailer or in a standard shipping container. If additional capacity if desired, the machine could be scaled and built as a static device. In one embodiment, the machine is portable and scaled to fit on a single self-contained and moveable platform. This would allow movement of the machine without any disassembly.

The machine is a complete system so it is only necessary to handle garbage or waste material once. So, garbage goes in and fuel comes out. The machine executes the process without additional human interaction. In the preferred embodiment, the machine is controlled via a single central control panel.

Bioburn Results position comprising sea salt and soy flour is formulated based upon the desired BTU and emissions levels.

Still referring to FIG. 2, the waste material is then deposited into a hopper (100), which, using a conveyance device (110), feeds the waste material into a shredder (120), and waste materials pass through a shredder (120) to produce waste material particles having a diameter not greater than one half inch. As an auger or conveyor (130) moves the sized waste material, the additive composition comprising the emission sponge, BTU modifier and filler is then added by an additive metering system (140) to the waste material particles until they are coated with the additive composition.

The coated waste material particles are then transferred into an area or other receiving container for further treatment and the moisture content and temperature of the mixture is determined. If the moisture content of the coated particulate matter is less than 12.0% by weight, water is added by nozzles (150) until the moisture content of the waste material particles is preferably between 18.0 to 23% by weight. The waste material and additive composition are then allowed to soak at temperature and for a time sufficient to destroy most biological agents, typically at a temperature of at least 130 degrees Fahrenheit, but preferably at least 135 degrees Fahrenheit, for at least one minute. If the temperature of the mixture is less than 130 degrees F., the temperature of the mixture is increased with an external heating device until the mixture reaches a temperature of at least 130 degrees Fahrenheit and allowed to soak for at least one minute. This step kills biological contaminants and accelerates breakdown of the mechanical bonds within the waste materials.

In an alternative embodiment, the waste material particles are coated with a corresponding additive composition formulation following the first size reduction then transferred into a vat or similar container. The water content and temperature of the waste material particles is measured and adjusted so that the water content is at least 12% by weight and the temperature is at least 130 degrees Fahrenheit, but preferably at least 135 degrees Fahrenheit.

| Id1 | Total Moisture | Dry Ash | As-Rec Ash | Dry BTU | As-Rec BTU | Dry Ash Free BTU | Dry Sulfur | As-Rec Sulfur | Sodium in Ash | Lbs SO2/MMBTU |
|---|---|---|---|---|---|---|---|---|---|---|
| Coal Pak | 8.13 | 12.65 | 11.62 | 14142 | 10236 | 12756 | 0.69 | 0.63 | 1.30 | 1.24 |
| Coal-Pak-dup | 8.10 | 13.17 | 12.10 | 14122 | 10221 | 12808 | 0.63 | 0.58 | 1.24 | 1.14 |
| Coal/Corn Stover (2) Pak | 7.10 | 15.14 | 14.07 | 8748 | 8128 | 10310 | 0.83 | 0.77 | 2.09 | 1.89 |
| Coal/Corn Stover (2) Pak-dup | 7.06 | 15.12 | 14.05 | 8758 | 8140 | 10318 | 0.84 | 0.78 | 2.03 | 1.93 |
| Coal/Bio Blend 3 Pak | 8.66 | 19.75 | 18.04 | 8719 | 7964 | 10865 | 0.95 | 0.87 | 1.53 | 2.19 |
| Coal/Bio Blend 3 Pak-dup | 8.61 | 20.07 | 18.34 | 8672 | 7925 | 10850 | 0.96 | 0.88 | 1.50 | 2.21 |
| Corn Stover Pak | 6.04 | 8.27 | 7.77 | 7573 | 7115 | 8256 | 0.07 | 0.06 | 0.76 | 0.18 |
| Corn Stover Pak-dup | 6.02 | 7.92 | 7.44 | 7524 | 7071 | 8171 | 0.05 | 0.05 | 0.80 | 0.14 |

EXAMPLES

Waste material is selected and evaluated for moisture level, BTU levels and emissions levels. An additive com- If needed, the size of the waste material particles are then reduced a second time by passing the coated particulates through a hammer mill (170) or similar size reduction device until the diameter of the waste material particulates is not greater than one half inch, but preferably not greater than one quarter inch. The milled waste material particulate and additive composition mixture is then transferred to the press. The press then forms the material into desired solid fuel formations such as pellets, briquettes, and spheres. The resulting fuel formations may then be coated with starch for product stabilization.

The scope of the invention is not limited to the specific embodiments described herein. Rather, the claim should be looked to in order to judge the full scope of the invention.

We claim:

1. A method of producing a low emission biomass fuel composition from waste material comprising the steps of:
   a. feeding waste material into a shredder;
   b. transferring the shredded waste material into a soaking area, wherein the soaking area comprises a moisture control device;
   c. measuring the moisture content of the shredded waste material contained within the soaking area with the moisture control device and adjusting the moisture content of the soaking waste material to be within a predetermined moisture range;
   d. treating the shredded waste material within the soaking area, with an additive comprising an emission sponge;
   e. transferring the treated waste material from the soaking area into a hammermill, and,
   f. forming solid fuel structures from the treated waste material received from the hammermill.

2. The method of claim 1, wherein the additive further comprises a BTU modifier.

3. The method of claim 1, wherein emission sponge comprises sea salt.

4. The method of claim 1, wherein the soaking area is a conveyor positioned between the shredder and a hammermill.

5. The method of claim 1, further comprising assessing the temperature of the waste material with a temperature monitoring device.

6. The method of claim 5, further comprising heating the treated material to a temperature of at least 130 degrees Fahrenheit for at least one minute.

7. The method of claim 1, wherein the solid fuel structures are formed with a press.

8. The method of claim 7, wherein the press is a roller press.

9. A solid fuel structure formed through the process comprising the steps of:
   a. feeding waste material into a shredder;
   b. transferring the shredded waste material into a soaking area, wherein the soaking area comprises a moisture control device;
   c. measuring the moisture content of the shredded waste material contained within the soaking area with the moisture control device, and adjusting the moisture content of the soaking waste material to be within a predetermined moisture range;
   d. treating the shredded waste material within the soaking area, with an additive comprising an emission sponge;
   e. transferring the treated waste material from the soaking area into a hammermill; and,
   f. forming solid fuel structures from the treated waste material received from the hammermill.

10. The solid fuel structure of claim 9, wherein the emission sponge is sea salt.

* * * * *